April 2, 1935.　　　　　J. SCHULMAN　　　　　1,996,259
COMBINED FENDER AND SPARE TIRE CASE
Filed July 14, 1932
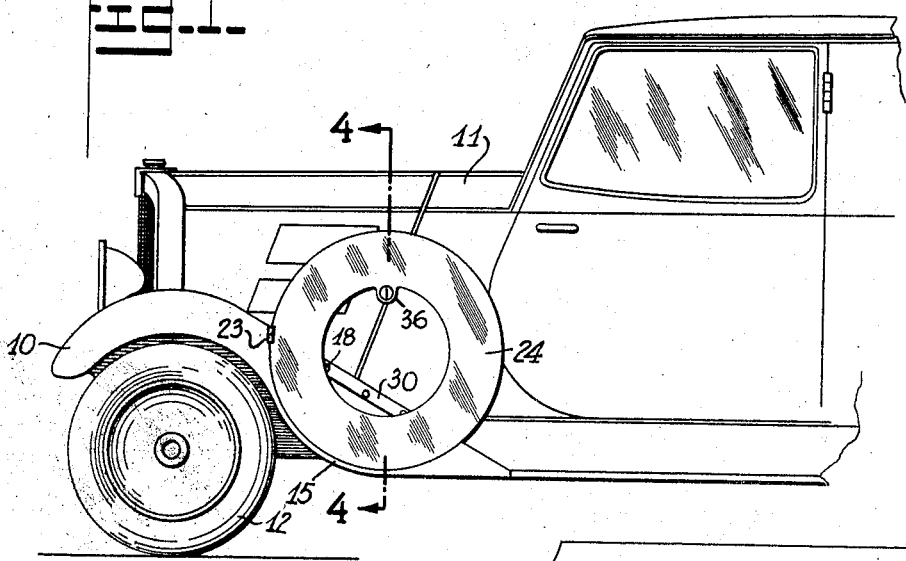
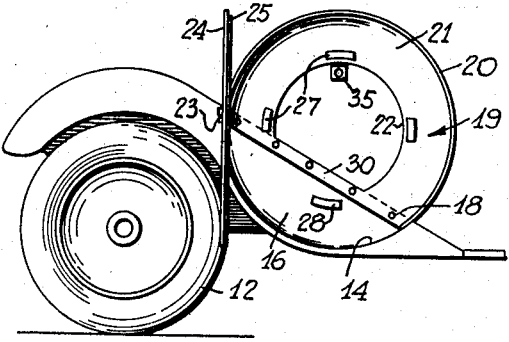
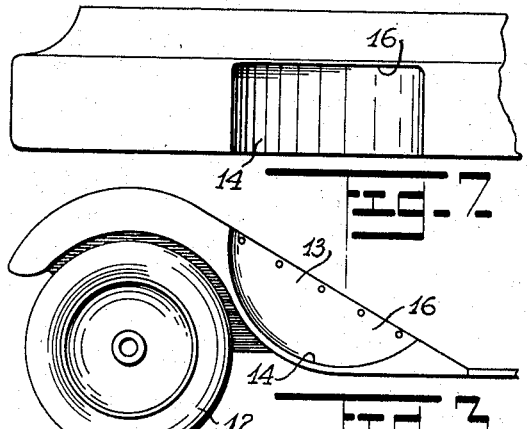
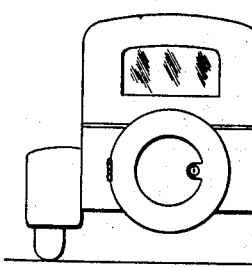
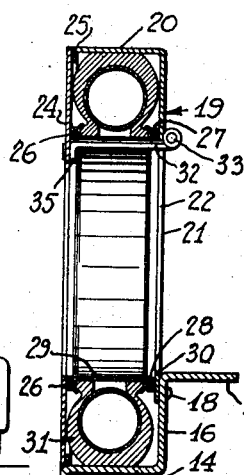
INVENTOR.
JOSEPH SCHULMAN.
BY
ATTORNEY.

Patented Apr. 2, 1935

1,996,259

UNITED STATES PATENT OFFICE 1,996,259

COMBINED FENDER AND SPARE TIRE CASE

Joseph Schulman, New York, N. Y.

Application July 14, 1932, Serial No. 622,473

11 Claims. (Cl. 224—29)

This invention is a combined fender and spare tire case for motor vehicles.

In motor vehicle fenders having a spare-tire receiving well, the well is located away from the outer side edge of the fender and sunk below the top surface thereof and the spare tire with the rim or wheel upon which it is mounted must be lifted out of the well to be removed, and being heavy and cumbersome, lifting the same out of the well is laborious. In the present invention, by forming a shelf at the outer side of the fender with its extremity at the edge thereof, to seat the spare tire, in lieu of the sunken well, the spare tire may be slidingly withdrawn without the lifting thereof, and the replacing of the spare tire upon the shelf is accomplished with less labor or effort than that which would be required if the sunken well were used.

In order to provide a complete protector for the spare tire when seated upon the shelf, in the present invention, a shell or frame and swingable side door is associated with the fender. When the door is opened the spare tire may be slidingly removed or inserted within the case or protector. This is in contrast with the case or cover heretofore used in association with the spare-tire well where in most instances the case or cover comprised sections or parts which were swung over and downwardly about their hinges to permit the spare tire to be lifted out of the well.

Heretofore where anti-rattlers were used to prevent the spare tire from rattling within the spare-tire case, they were located to abut against the spare-tire proper, so that in the event that the tire was in a deflated condition, the anti-rattlers would be ineffective to prevent rattling. In the present invention, the anti-rattlers are positioned to abut against the rim upon which the tire is mounted and thus positively prevents rattling.

An object of this invention is to provide a combined motor vehicle fender and spare-tire case having a hinged door and which is adapted to permit the tire to be slidingly withdrawn laterally of the fender without requiring the spare tire to be lifted therefrom, the fender portion of the casing being so formed that it requires but a slight lifting of the tire to insert the same within the casing.

A further object of the invention resides in the provision of a spare-tire case having a hinged door and which is adapted to permit the tire to be slidingly withdrawn without any lifting thereof.

A further object of the invention is to provide a combined motor vehicle fender and spare-tire case having a hinged door which opens at the outer side of the fender, the fender being pressed to provide a section forming part of the rear wall and bottom of the tire case, the case being detachably secured to the fender in such manner that it may be removed only after the door is opened; the removal of the tire case may be desired for instance, for the purpose of more readily gaining access to the motor.

A further object of the invention resides in providing a combined motor vehicle fender and spare-tire case having a hinged door opening at the front side thereof and adapted to receive the spare tire and the rim (which may be of the demountable type or which may form an integral part of the wheel) upon which it may be mounted, with means for cooperating with the rim to prevent the tire and rim from rattling, also with means to provide a locking member for cooperating with a complementary locking member on the door by which the door may be locked to the body of the case, said means being adapted to aid in securing the spare tire against movement in the case.

A further object of this invention is to provide a spare-tire case comprising a ring, an annular flange integral with one side of the ring, and an annular flange hingedly engaged with the opposite side of the ring to serve as a door for permitting the entry and removal of the spare tire.

To attain these objects and such other objects as may appear herein and may hereinafter be pointed out, reference is made to the accompanying drawing forming a part hereof and in which:

Fig. 1, is a side view of the front portion of a motor vehicle with a combined fender and spare-tire case thereon which is made according to and embodies the invention.

Fig. 2, is a side view of part of the front portion of the motor vehicle with the said combined fender and spare-tire case thereon, the hinged side door of the latter being shown in open position.

Fig. 3, is a view showing a form of fender made in accordance with the invention.

Fig. 4, is a sectional view taken along line 4—4 of Figure 1.

Fig. 5, is a view showing a modified form of spare-tire casing which is made according to and embodies the invention.

Fig. 6, is a diagrammatic rear view of a motor vehicle with a tire protector thereon made in accordance with and embodying the invention.

Fig. 7, is a top view of Figure 3.

In the embodiment of the invention illustrated in Figures 1–4, inclusive, the numeral 10 indicates a front fender of a motor vehicle 11 attached thereto in the usual manner. The fender rearwardly of the wheel 12 is provided with an arcuate portion 13 having a longitudinally-curved and transversely-flat shelf or bottom 14, with its outer side extremity at the edge of the fender and preferably terminating in a downwardly-turned outer side lip 15, and an upwardly-extending inner side wall 16, the fender at the extremity of said wall 16 being bent at an angle thereto and extending rearwardly thereof as indicated by the numeral 17. The circularly-curved bottom 14 and inner side wall 16 form a portion of the spare-tire case. By this construction the shelf or bottom 14 upon which the spare tire is to be seated is brought close to the ground so that the spare tire may be lifted thereupon with a minimum of effort.

Secured to the inner side wall 16 by bolts 18 or any other suitable means is a shell or frame 19 having a transversely-flat top 20 which is circularly curved longitudinally from front to rear so as to form a continuation of the circular curve of the bottom 14. Shell 19 has an inner side wall 21, which may be longitudinally inclined at its bottom 30 from rear to front to conform with the similarly inclined upper edge of wall 16, in which event the bottom portion of said inner side wall 21 will overlap said inner wall 16 for securing the shell 19 to the latter. Shell 19 is shown as having a central opening 22, but it is understood that the wall 21 may be made solid. It is preferable to have shell 19 removably attached to the fender in order that it may be removed for the purpose of more readily gaining access to the motor of the automobile for making repairs thereto.

Hingedly connected to shell 19 by hinge 23 is a circular flat outer side door 24 having an inner ring 25 to fit snugly under and against the top 20 of shell 19 and over and against the bottom 14 of the tire-receiving portion of the fender. The ring 25 is preferably of metal to reinforce the door. The bottom of door 24 may be flush with flange 15 of the fender when the door is in closed position. Door 24 is shown as an annulus, but may be made solid.

Secured to the inside of door 24, side wall 21 of the shell and inner side wall 15 of fender are cushioning means or anti-rattlers 26, 27 and 28, respectively, adapted to cooperate with the rim 29 upon which the spare tire 31 is mounted to prevent the spare tire and rim when placed within the casing, from rattling. For that purpose the anti-rattlers are arranged to abut or press against the rim 29 when door 24 is closed. By having the anti-rattlers pressing or abutting against the rim 29 instead of against the tire, then in the event that the tire is in a deflated condition, the tire and rim would not rattle in the case. The anti-rattlers may be made of rubber or any other suitable resilient material. The anti-rattlers 26 may comprise an annular ring secured inside the door 24 or may be separate pieces arranged circumferentially thereon. The cushions 27 and 28 may comprise circularly-curved pieces secured to the inside of the shell and the side wall 16 or may comprise small pieces circumferentially arranged thereon, as shown in the drawing.

Hingedly secured to the side wall 21 of the shell is a latch having a bar 32 pivoted at 33 and extending the width of the shell and through the opening 22. Bar 32 is adapted to abut against the rim 29 of the wheel when the bar is in horizontal position. The bar 32 has a downwardly-extending lug 35 at its outer extremity which is perforated and cooperates with a downwardly-extending perforated lug 36 on the side door 24 to provide complementary means for receiving a lock by which the door may be locked to the body of the case. The bar 32 aids in removably holding the spare tire in the case.

From the above description, it will be seen that the tire-receiving portion of the fender is located at the outer side thereof. The shelf or bottom 14 being transversely flat, the spare tire may be slidingly withdrawn axially without requiring the spare tire to be lifted from the fender. It is also to be observed that the fender portion of the tire case is so formed that it requires but a slight lifting of the tire to insert the same within the casing thereby being accomplished with little labor.

The fender is seen as having a recessed portion to fit the curvature of the tire, constituting a shelf 14 upon which the tire may rest, and an inner side wall 16 forming a sector of the rear wall of the case, the shell or frame 19 constituting a complementary section comprising a flange 20 completing a circle with shelf 14, to compose a ring or longitudinally-curved wall and an annular or circularly-curved wall 21 integral therewith which together with the first mentioned section completes the rear wall of the casing, the circular plate or annular member 24 being in swingable engagement with the front edge of the case to serve as a door. The fender portion and shell completes a substantially-cylindrical receptacle to receive the spare tire, the door being hinged to the outer side of the cylinder.

It is preferable to attach the shell to the fender in such manner that the shell may be removed only after the case door is opened, thereby securing the device against theft.

To insert the spare tire within the casing, it is merely lifted to the edge of the shelf 14 of the fender and slid within the casing, the side door 24 is then closed and locked, and the spare tire and rim upon which it is mounted is firmly held therein against rattling.

In Figure 5, the spare-tire case is shown as being similar to the above described with the exception of rear wall 21' and flange 20' being of continuous circular shape and opening 22', therefore, also circular. Door 24' is substantially similar to door 24 hereinabove described, having hinge 23' and lock extension 36'. The rear wall 21' and door 24' may constitute flat circular solid plates. The anti-rattling, and locking means are similar to that heretofore described with reference to the preferred embodiment. This structure may be placed upon shelf 14 of the fender and removably or fixedly secured to the fender by any suitable means. The inner ring 25' is similar to the inner ring 25 heretofore described.

In Figure 6, which is a diagrammatic rear view of a motor vehicle with a spare-tire case thereon, the tire case is of similar construction to that shown in Figure 5, with the exception that the locking members on the door and shell are located opposite the hinge. It is understood, however, that the embodiments of spare-tire case as having hereinabove described and shown may be attached to any suitable part of the motor vehicle.

In the drawing the wall for circumposing the spare tire is shown as substantially cylindrical, and the rear wall and door as substantially circular, but it is understood that these parts respectively, may be made in any desired shape or form.

In the accompanying drawing I have illustrated the invention embodied in its practical commercial forms but as these illustrations are primarily for purposes of disclosure it will be understood that the invention is not limited to these particular forms of structure and that it may be modified in many respects without departure from the true spirit and scope of the invention as herein defined and claimed. I wish it further understood that the terms which I have employed herein are used in a descriptive rather than in a limiting sense, except however for such limitations that may be imposed by the state of the prior art.

Having thus described my invention, what I claim as new and desire to secure by Letters Patent, is:

1. A combined fender and spare-tire case comprising a fender having an arcuate recess to seat the spare-tire and opening through the outer side of the fender to permit axial placement of the tire therein and withdrawal therefrom, the inner side wall of the recess forming a section of the rear wall of the case, a segment ring completing a circle with the bottom of the recess and having an annular flange integral therewith which together with said side wall forms the rear wall of the case, and an annular member swingably engaged with the front edge of the case to serve as a door.

2. A combined fender and spare-tire case comprising a fender having an arcuate recess to seat the spare-tire and opening through the outer side of the fender to permit axial placement of the tire therein and withdrawal therefrom, the inner side wall of the recess forming a section of the rear wall of the case, an annular top completing a circle with the bottom of the recess and having a back which together with said inner side wall forms the rear wall of the case, and a circular front member swingably engaged with the front edge of the case to serve as a door.

3. A combined fender and spare-tire case comprising a fender having a recess to seat the spare-tire and opening through the outer side of the fender to permit axial placement of the tire therein and withdrawal therefrom, an arcuate frame adapted to be removably secured to the fender above the recess to complete with the bottom of the recess a housing for the reception of the tire, and a door hinged to the outer side of the frame.

4. A spare-tire case comprising a fender portion having a longitudinally-curved transversely flat part for supporting the tire and an inner side wall extending upwardly from said part forming a section of the case, and a shell secured to said fender portion, said shell having a longitudinally-curved top to form a continuation of the curve of said part and an inner side wall which together with the said former inner side wall constitutes the rear wall of the case, said section and said shell being open at their outer sides for axial movement of the tire in and out of the case, and a door swingably secured to the outer side of the case.

5. A spare-tire support comprising a fender having a longitudinally-curved substantially transversely-flat portion and an inner side wall extending upwardly from said portion forming a recess to accommodate the tire and opening through the outer side of the fender whereby the tire may be moved axially into and out of the support.

6. A spare-tire case comprising a fender portion having a longitudinally-curved transversely-flat part for supporting the tire and an inner side wall extending upwardly from said part, said part and said wall forming a section of the case, and another section which together with the first section completes the case, both sections being wholly open at their outer side for axial movement of the tire in and out of the case, and a door to cover the open side of both sections.

7. A combined fender and spare-tire receptacle having an arcuate recess to accommodate the spare-tire, said recess having a bottom and inner wall and opening through the outer side of the fender whereby the spare-tire may be placed in and withdrawn from the recess by a lateral movement with respect to the bottom through the said outer side.

8. A combined fender and spare-tire receptacle having a substantially L-shaped recess to accommodate the spare tire and opening through the outer side of the fender whereby the spare-tire may be placed in and withdrawn from the recess by a lateral movement with respect to the bottom of the recess through the said outer side.

9. A vehicle fender having a well to accommodate a spare-tire, said well having a bottom and inner wall and being open at its front whereby the spare-tire may be placed in and withdrawn from the well by a lateral movement with respect to the bottom of the well through said front.

10. A vehicle fender having a recess to accommodate a spare-tire, said recess having a bottom and inner wall and opening through the outer side of the fender whereby the spare-tire may be placed in and withdrawn from the recess by a lateral movement with respect to the bottom through said outer side, and a closure for said outer side.

11. A combined fender and spare-tire case comprising a fender having an arcuate recess to seat the spare-tire and opening through the outer side of the fender to permit axial placement of the tire therein and withdrawal therefrom, the inner side wall of the recess forming a section of the rear wall of the case, and a segment ring completing a circle with the bottom of the recess having an annular flange integral therewith which together with said side wall forms the rear wall of the case.

JOSEPH SCHULMAN.